(12) United States Patent
Ichinose

(10) Patent No.: US 6,823,733 B2
(45) Date of Patent: Nov. 30, 2004

(54) Z-AXIS VIBRATION GYROSCOPE (75) Inventor: Toshihiko Ichinose, Farmington, MI (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 53 days.

(21) Appl. No.: 10/287,281

(22) Filed: Nov. 4, 2002

(65) Prior Publication Data
US 2004/0083812 A1 May 6, 2004

(51) Int. Cl.⁷ .............................. G01C 19/00; G01P 9/00
(52) U.S. Cl. .................................. 73/504.02; 73/504.14
(58) Field of Search ........................ 73/504.04, 504.12, 73/504.14, 504.16, 504.02, 514.32

(56) References Cited

U.S. PATENT DOCUMENTS

| | | |
|---|---|---|
| 3,113,463 A | 12/1963 | Holt, Jr. |
| 3,696,429 A | 10/1972 | Tressa |
| 3,839,915 A | 10/1974 | Schlitt |
| 4,122,448 A | 10/1978 | Martin |
| 4,126,046 A | 11/1978 | Erdley |
| 4,144,764 A | 3/1979 | Hartzell, Jr. |
| 4,155,257 A | 5/1979 | Wittke |
| 4,326,428 A | 4/1982 | Bostwick et al. |
| 4,336,718 A | 6/1982 | Washburn |
| 4,414,852 A | 11/1983 | McNeill |
| 4,590,801 A | 5/1986 | Merhav |
| 4,654,663 A | 3/1987 | Alzenz et al. |
| 4,727,752 A | 3/1988 | Peters |
| 4,735,506 A | 4/1988 | Pavlath |
| 4,761,743 A | 8/1988 | Wittke |
| RE32,931 E | 5/1989 | Staudte |
| 4,834,538 A | 5/1989 | Heeks et al. |
| 4,898,032 A | 2/1990 | Voles |
| 4,922,756 A | 5/1990 | Henrion |
| 4,929,860 A | 5/1990 | Hulsing, II et al. |
| RE33,479 E | 12/1990 | Juptner et al. |
| 4,981,359 A | 1/1991 | Tazartes et al. |
| 5,016,072 A | 5/1991 | Greiff |
| 5,090,809 A | 2/1992 | Ferrar |
| 5,094,537 A | 3/1992 | Karpinski, Jr. |
| 5,138,883 A | 8/1992 | Paquet et al. |
| 5,197,331 A | 3/1993 | Oikawa |
| 5,203,208 A | 4/1993 | Bernstein |
| 5,205,171 A | 4/1993 | O'Brien et al. |
| 5,226,321 A | 7/1993 | Varnham et al. |
| 5,233,874 A | 8/1993 | Putty et al. |
| 5,241,861 A | 9/1993 | Hulzing, II |
| 5,249,465 A | 10/1993 | Bennett et al. |
| 5,349,855 A | 9/1994 | Bernstein et al. |
| 5,359,893 A | 11/1994 | Dunn |
| 5,377,544 A | 1/1995 | Dunn |
| 5,392,650 A | 2/1995 | O'Brien et al. |
| 5,408,877 A | 4/1995 | Greiff et al. |
| 5,488,862 A | 2/1996 | Neukermans et al. |
| 5,535,902 A | 7/1996 | Greiff |
| 5,555,765 A | 9/1996 | Greiff |
| 5,604,311 A | 2/1997 | Kumar et al. |
| 5,604,312 A | 2/1997 | Lutz |
| 5,635,638 A * | 6/1997 | Geen ................... 73/504.04 |
| 5,635,640 A | 6/1997 | Geen |
| 5,650,568 A | 7/1997 | Greiff et al. |
| 5,728,936 A | 3/1998 | Lutz |
| 5,889,208 A | 3/1999 | Nose |

(List continued on next page.)

Primary Examiner—Helen Kwok
(74) Attorney, Agent, or Firm—Harness, Dickey & Pierce, PLC (57) ABSTRACT An angular velocity sensor is disclosed having a sensing element and a pair of driven mass drive elements. The driven mass drive elements have a support structure which defines at least one vibrational node. the driven mass drive element drive elements are coupled to the sensing element at the node so as to allow the driven mass drive elements to oscillate about an axis to generate Coriolis forces, which are measured by the sensing element.

19 Claims, 10 Drawing Sheets

U.S. PATENT DOCUMENTS

| | | | |
|---|---|---|---|
| 5,895,850 A | 4/1999 | Buestgens | |
| 5,895,852 A | 4/1999 | Moriya et al. | |
| 5,911,156 A * | 6/1999 | Ward et al. | 73/504.16 |
| 5,918,280 A | 6/1999 | Gang et al. | |
| 5,945,599 A | 8/1999 | Fujiyoshi et al. | |
| 5,945,600 A | 8/1999 | Touge et al. | |
| 5,955,668 A | 9/1999 | Hsu et al. | |
| 5,969,225 A | 10/1999 | Kobayashi | |
| 5,992,233 A | 11/1999 | Clark | |
| 6,023,972 A | 2/2000 | Hulsing, II | |
| 6,044,707 A | 4/2000 | Kato | |
| 6,067,858 A | 5/2000 | Clark et al. | |
| 6,070,463 A | 6/2000 | Moriya et al. | |
| 6,089,089 A | 7/2000 | Hsu | |
| 6,122,961 A | 9/2000 | Geen et al. | |
| 6,189,381 B1 * | 2/2001 | Huang et al. | 73/504.12 |
| 6,192,756 B1 | 2/2001 | Kikuchi et al. | |
| 6,244,111 B1 | 6/2001 | Funk | |
| 6,250,156 B1 | 6/2001 | Seshia et al. | |
| 6,308,567 B1 | 10/2001 | Higuchi et al. | |
| 6,308,568 B1 | 10/2001 | Moriya | |
| 6,321,598 B1 | 11/2001 | Iwaki et al. | |
| 6,349,597 B1 | 2/2002 | Folkmer et al. | |
| 6,386,033 B1 * | 5/2002 | Negoro | 73/504.12 |
| 6,561,029 B2 * | 5/2003 | Folkmer et al. | 73/504.14 |
| 6,571,630 B1 * | 6/2003 | Weinberg et al. | 73/504.16 |
| 2001/0008087 A1 | 7/2001 | Mochida | |
| 2001/0013252 A1 | 8/2001 | Namerikawa et al. | |
| 2001/0020219 A1 | 9/2001 | Kishlock et al. | |
| 2001/0045127 A1 | 11/2001 | Chida et al. | |

* cited by examiner

Z-AXIS VIBRATION GYROSCOPE

FIELD OF THE INVENTION

The present invention relates to a sensing device which utilizes gyroscopic principles to measure Coriolis force created by the conservation of momentum of driven bodies and, more particularly, to a micro-gyroscopic sensor which vibrationally de-couples a driven mass from the sensing device's sensing structure.

BACKGROUND AND SUMMARY OF THE INVENTION

There are several significant defects in the prior art micro-gyroscopic sensors. Typically, these sensors rely on a single mass element for both driving and sensing functions or rely on multiple mass elements which are physically coupled to a sensor. This coupling of the driving and output motion severely limits the sensitivity of the gyroscope. For example, as the drive element is vibrationally driven, a parameter that affects the sensing mechanism is the amount of vibrational energy which crossovers from the driven element to the sensing electrodes. In the presence of a vibrational crossover, the Coriolis force which is small is difficult to detect, thereby limiting the sensitivity of the sensor.

In all prior art designs there is also a lack of ability to correct for vibrational crossover of the system due to manufacturing tolerances. The problem is worsened by the use of a single support element to couple the driven element to the sensing element. Since the single support element's length varies during manufacturing, its structure will often generate undesirable signals that corrupt the intended signal.

Furthermore, sensors typically utilize support structures having a plurality of support poles. This configuration leads to significant errors caused by temperature changes. These temperature changes cause thermal expansion of the components which require complicated control algorithms to adjust both the drive and sensing structures.

In one embodiment of the invention, an angular velocity sensor is disclosed having a sensing element and a pair of driven mass drive elements. Each of the driven mass drive elements have a support structure which defines at least one vibrational node. The driven mass drive elements are coupled to the sensing element at the node so as to allow the driven mass drive elements to oscillate about an axis to generate Coriolis forces which are measured by the sensing element, without transmitting oscillation energy to the sensing elements.

In another embodiment of the invention, an angular velocity sensor is disclosed having a sensing element and a plurality of drive elements. The drive elements are coupled to the sensing element through a support structure defining a tuning fork. The tuning fork structure defines at least one vibrational node. The sensing element is coupled to the drive element through the vibrational node. The drive element further oscillates about an axis and has an inertial mass configured to generate Coriolis forces which are measured by the sensor.

In another embodiment of the invention, an angular velocity sensor is disclosed having a support frame, a plurality of drive elements and a motion sensor. The drive elements are coupled to the support frame through a support structure defining a double tuning fork. The support structure defines at least one vibrational node, the support structure being coupled to the support frame at the node. The sensing element is coupled to the support frame while the drive elements oscillate about an axis and has an inertial mass configured to generate Coriolis forces.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention. It is however an object of the present invention to provide an improved gyroscopic sensor which overcomes the deficiencies of the prior art micro-machined gyroscopic sensors.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
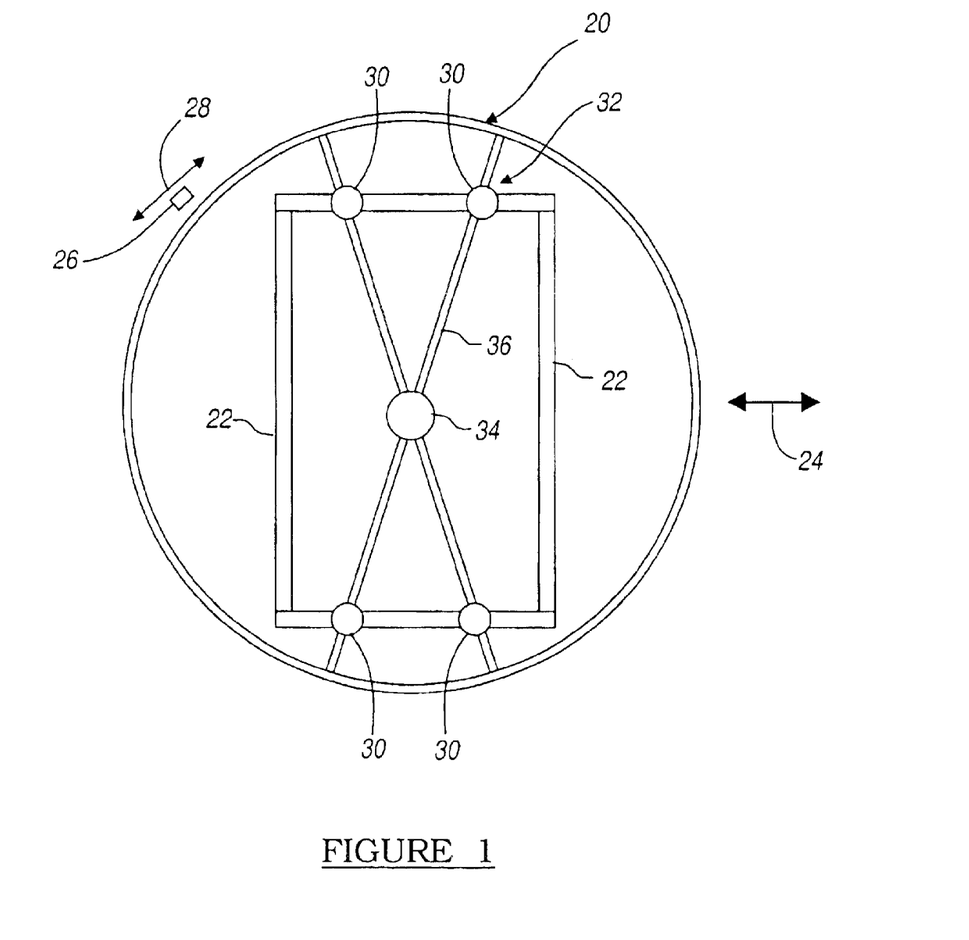
FIG. 1 represents a top view of a sensor according to the teachings of the present invention.
Figure 2A:
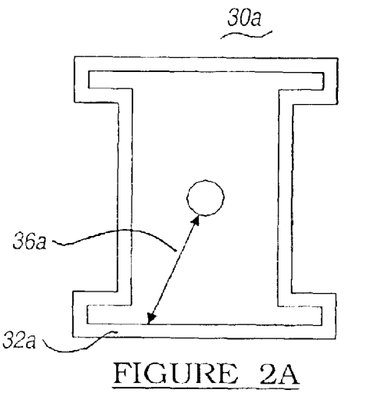
FIGS. 2A–2D represent various support structures according to the teachings of the present invention.
Figure 2B:
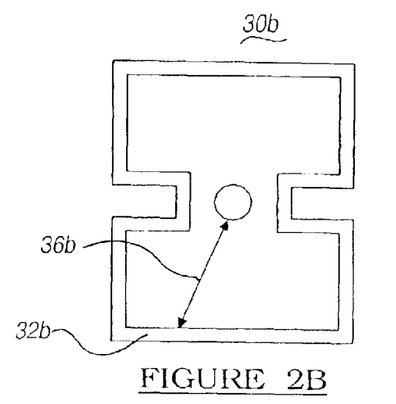
Figure 2C:
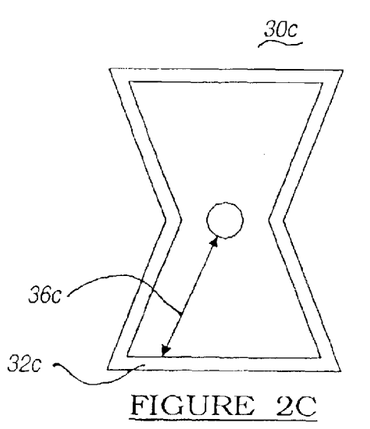
Figure 2D:
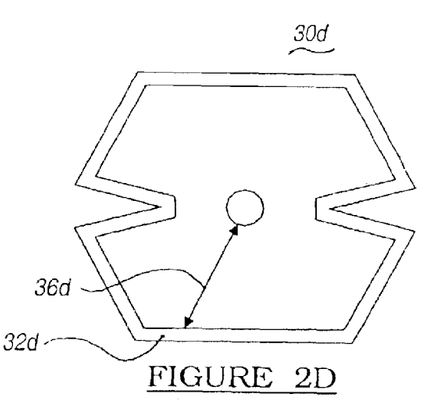

Presented in FIG. 1 is a schematic representation of the sensor 20 according to the teachings of the present invention. The sensor 20 has a pair of drive elements 22 which vibrate in a first direction 24, and a sensing element 26 which measures Coriolis forces in a second direction 28.

The drive elements 22 are coupled to the sensing element 26 in a manner which vibrationally isolates the drive elements 22 from the sensing element 26. In this regard, the drive elements 22 are coupled to the sensing element 26 utilizing a support structure 30 having a vibrational node 32. The node 32 is a position on the support structure 30 where there is no movement of the support structure 30 when the support structure 30 is excited at a resonant frequency. By disposing a vibrational node 32 between the drive elements 22 and the sensing elements 26, driving oscillations associated with the driven elements 22 are isolated from the sensing elements 26, without unnecessarily restricting the movement of the drive elements 22. The support structure 30, which is preferably a tuning fork, allows for the transfer of Coriolis forces from the drive elements 22 to the sensing elements 26.

The use of a tuning fork design as a support structure 32 allows for the production of a support structure 30 which has an accurately determinable vibrational resonant frequency. In this regard, each support structure 30 is produced so as to have a predefined resonant vibrational frequency. Typically, the manufacturing of single member support structures often leads to variations in resonant frequencies of the assembled components. The varying resonant frequencies of these structures can lead to significant errors within the sensors 20. As the Coriolis forces being measured are very small, even small measurement errors can significantly affect the sensors effectiveness.

To overcome this problem, the support structure 30 is designed to utilize a double tuning fork configuration. Axiomatic of the tuning fork configuration is the "tempering" of defects related to improper formation of the drive elements due to the afore mentioned manufacturing tolerances. In this regard, tuning fork configurations provide structures having single predictable resonant frequencies. Further, tuning fork configurations define predictable nodal locations.

When discussing a tuning fork herein, applicant defines the structure as having more than one driven member, each member having similar resonant frequencies. The members are coupled together by a common member, which allows for vibrational interaction between the members. This interaction leads to an overall structure having a single resonant frequency which is very close to and is a function of the driven members resonant frequencies. Applicant herein defines a double tuning fork as a structure formed by two sets of generally parallel members. Each pair of generally parallel members being cantileverly coupled at one end to respective common members. A second end of the cantilevered members is coupled to a single mass. Is envisioned that each cantilevered member has similar or the same resonant frequencies.

Figure 3:
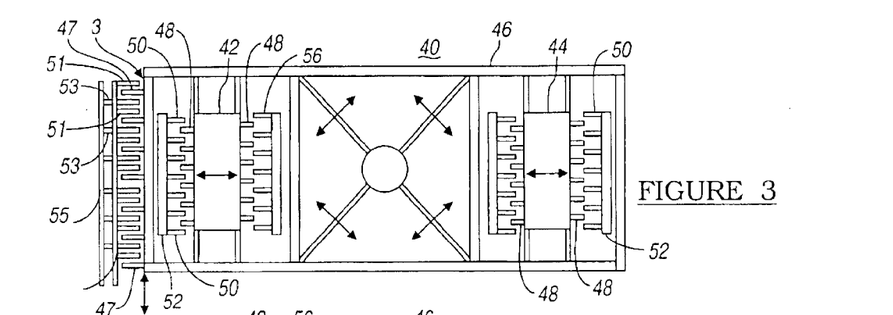
FIG. 3 depicts a top view of a sensor according to the teachings of the first embodiment of the invention.

FIGS. 2A–2D represent various support structures 30a–30d. The support structures 30a–30d vibrational nodes 32a–32d. FIG. 3 represents a top view of the sensor 40 according to the teachings of the first embodiment. Shown are first and second driven elements 42 and 44 being coupled to a support frame 46. The driven elements 42 and 44 have a plurality of charge bearing plates 48 interleaved between the charge bearing plates 50 forming a driven member drive comb 52. The exterior surface of the support frame 46 defines a plurality of charge bearing plates 47. These charge bearing plates are interleaved between the charge bearing plates 51 and 53 of a sensing comb (+) 55 and sensing comb (−) 57.

Application of an alternating charge to the plates 50 of the drive comb 52 causes the driven members 42 and 44 to oscillate. By applying charges at a frequency equal to the vibrational resonant frequency of the driven members 42 and 44, an associated support structure 45 causes the driven members 42 and 44 to oscillate in the drive direction 54. Movement of the driven members 42 and 44 is monitored by the monitoring comb 56, which are disposed adjacent to the driven members 42 and 44. Signals from the monitoring comb 56 are used to vary the input to the driven member comb 52.

Rotation of the sensor 40 in its frame of reference as well as conservation of momentum of the oscillating driven elements 42 and 44 lead to Coriolis forces, which cause the rotation of the support frame 46. This rotation causes the charge bearing plates 47 on the support frame 46 to translate. This translation is measured by the charge bearing plates 51 and 53 of the sensing combs 55 and 57. Capacitance between the charge bearing plates 47, 51, and 53 is measured. In this regard, a single sensing comb 57 may be used to measure bidirectional movement of the charged plates 47 disposed on the support frame 46.

The output or sensed value is detected by measuring the rocking motion of the support frame 46 about the axis defined by the single support pole. There are several ways for sensing such movement. Available methods include measuring changes in capacitance, piezo-electric, magnetic, and optical. In the preferred embodiment, capacitance is used as the sensing medium.

As shown in FIG. 3, charge plates 51 and 53 of the sensing combs 55 and 57 are used to detect the change in capacitance when the support frame 44 oscillates. The electrodes 51, 53 and 47 form pairs of parallel capacitors; when the distance between the charged plates 51, 53 and 47 changes, the value of capacitance also changes. This capacitance change can be measured by using electrical circuits known to those skilled in the art. The two sensing combs 55 and 57 operate in the opposite sense, i.e., when one capacitor increases, the other decreases. The opposite sensing capacitors provide a way to accomplish differential sensing, which results in improved sensitivity. In the differential mode, as opposed to the absolute mode, the effects of environment and electrical noise are drastically reduced because these effects are canceled out. All effects that affect both capacitors are eliminated from the sensing circuit.

With general reference to FIGS. 1 and 2, the support frame 46 and depending driven elements 42 and 44 are supported by a single support pole 60. Disposed between the support pole 60 and the support frame 46 are four rotation arms 66. The use of a single support pole 60 in conjunction with rotational arms 66 reduces the detrimental effects of thermal expansion, which causes the charged plates of the driven members 42 and 46 as well as sensing combs 55 and 57 to be moved relative to each other.

As can be seen, the support frame defines a truss structure. The support frame 46 in this embodiment is formed of two generally parallel longitudinal beams 68 and 70. Disposed between the longitudinal beams 68 and 70 are four transverse members 72, 74, 76, and 78. The rotation arms 66 are disposed between the support pole 60 and the intersection of an interior pair of transverse members 74 and 76 with the longitudinal beams 68 and 70. Each driven member is disposed between the interior transverse members 74 and 76 and the exterior transverse members 72 and 78. Disposed on one of the exterior transverse members 72 is the plurality of plates.

Figure 4:
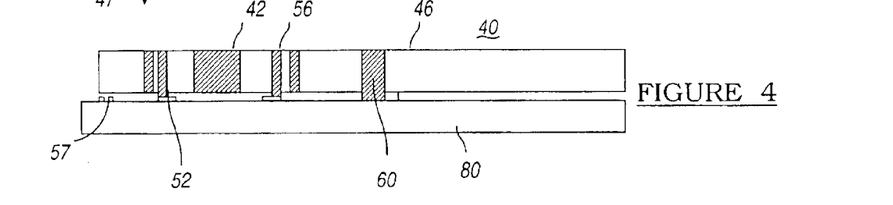
FIG. 4 represents a side view of the sensor according to the teachings of the first embodiment of the present invention.

FIG. 4 depicts a side view of a first embodiment of the present invention. Shown is the support pole 60 which suspends the support frame 46 over a substrate material 80. As can be seen, both the drive comb 52 and the monitoring comb 56 are isolated from the driven members 42 and 44 by being mounted directly to the substrate material 80. Additionally, the sensing comb (+) 52 and sensing comb (−) 57 are physically coupled to the substrate material 80.

Figures 5, 6:
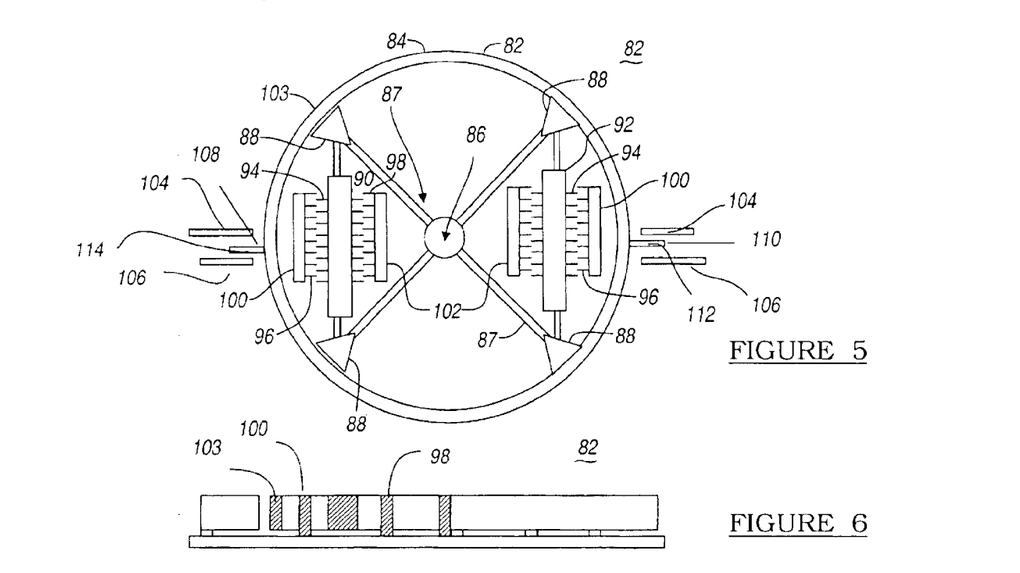
FIG. 5 represents the top view of the sensor according to a second embodiment of the present invention.
FIG. 6 represents a side view of the second embodiment of the present invention.

FIGS. 5 and 6 represents a second embodiment of the gyroscopic sensor 82 according to the teachings of the present invention. The sensor 82 has a circular support frame 84 which is supported by four rotation arms 87 that couple the circular support frame 84 to a support pole 86. Defined at the intersection of the rotation arms 86 and the circular support frame 84 are four node points 88. Disposed between the node points 88 are a pair of parallel driven members 90 and 92. As described above, the driven members 90 and 92 have a plurality of charged plates 94 which interleave with charge plates 96 and 98 and the drive and monitoring combs 100 and 102.

Disposed on the outside surface 103 of the circular support frame 84 is a pair of charged plates 104 and 106 which interleave with the charged plates 108 and 110 of the sensing comb (+) 112 and sensing comb (−) 114. Rotating the sensor within its frame of reference causes Coriolis forces to be developed, causing the circular support frame 84 to rotate about support pole 86.

Figure 7:
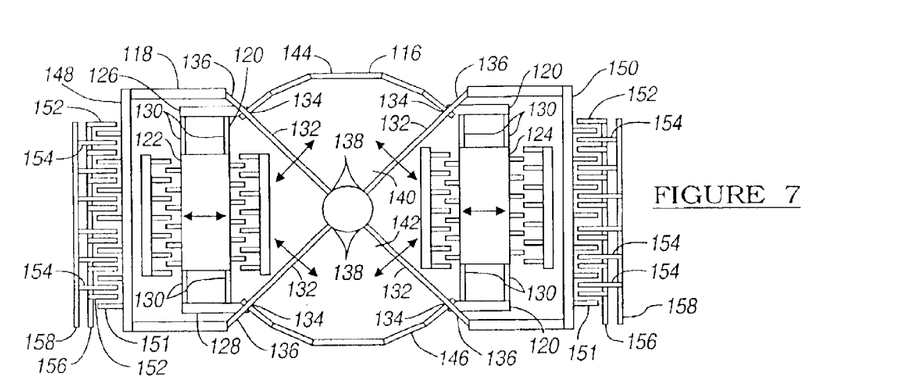
FIG. 7 represents a top view of the third embodiment of the present invention.
Figure 8:
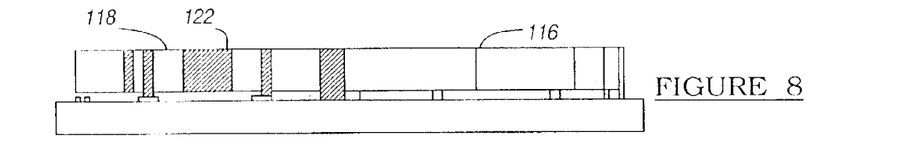
FIG. 8 represents a side view of the sensor according to the teachings of the third embodiment of the present invention.

FIGS. 7 and 8 represent a third embodiment according to the teachings of the present invention. Shown is a sensor 116 having a generally rectangular exterior support frame 118. In this embodiment, the support structure 120 for the driven elements 122 and 124 is decoupled from the support frame 118. In this regard, the driven elements 122 and 124 are coupled to a pair of support members 126 and 128 by two pair of flanges 130. Each pair of flanges 130 functions as a two element tuning fork. The support members 126 and 128 of the support structure 120 are coupled to a rotational arm 132 at nodal points 134 disposed between the ends 136, 138 of the rotation arm 132.

In this regard, the rotation arms 132 form a pair of vertical congruent angles 140 and 142. Disposed between the rotation arms 132 forming the congruent angles 140 and 142 is a pair of generally circular support beams 144 and 146 coupled to the rotation arm 132 at the intersection of the driven member support structure 130 and the rotation arm 132. The support frame 118 is bounded by a pair of exterior transverse members 148 and 150 which define a plurality of charged plates 151 that interleave with the charged plates 152 and 154 to form the sensing comb (+) 156 and sensing comb (−) 158.

Figure 9:
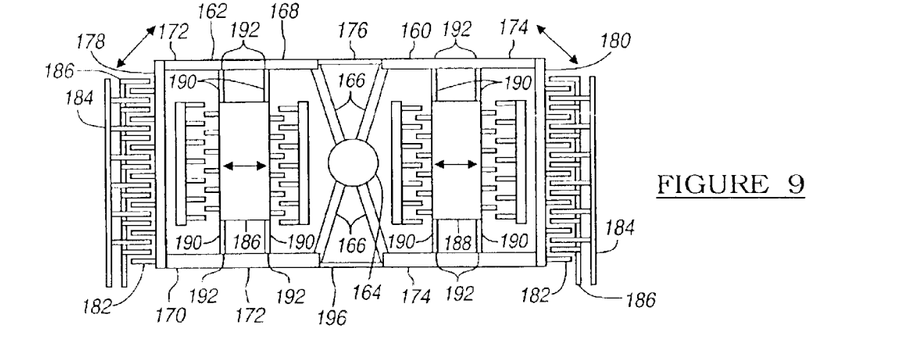
FIG. 9 represents a top view of a fourth embodiment of the present invention.
Figure 10:
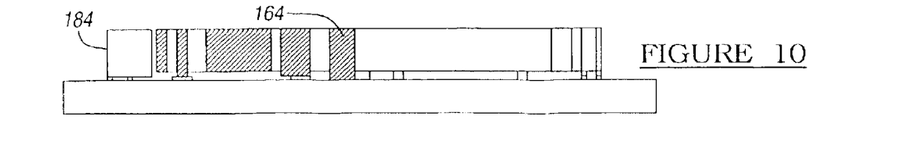
FIG. 10 represents a side view of the fourth embodiment of the present invention.

Referring generally to FIGS. 9 and 10 which represent a fourth embodiment of the present invention. Shown is a sensor 160 having an exterior support frame 162 coupled to a support pole 164 by four rotation arms 166. The support frame 162 is defined by two generally parallel longitudinal structures 168 and 170. Each structure 168 and 170 is formed by first and second beams 172 and 174 and a co-axial central beam 176. The central beam 176 being of a thickness lower than the thickness of the first and second beams 172 and 174. Additionally, the support frame 162 is defined by a pair of exterior transverse beams 178 and 180 which define a plurality of flanges which form a sensor charged plates 182 with the sensing comb (+) 184 and sensing comb (−) 186.

Directly coupled to the support frame 162 are a pair of driven elements 186 and 188. Each driven element 186 and 188 is coupled directly to the support frame 162 utilizing two pair of support members 190. The two pair of support members 190 function to form a tuning fork assembly, which is coupled to the support frame 162 at nodal points 192.

Figure 11:
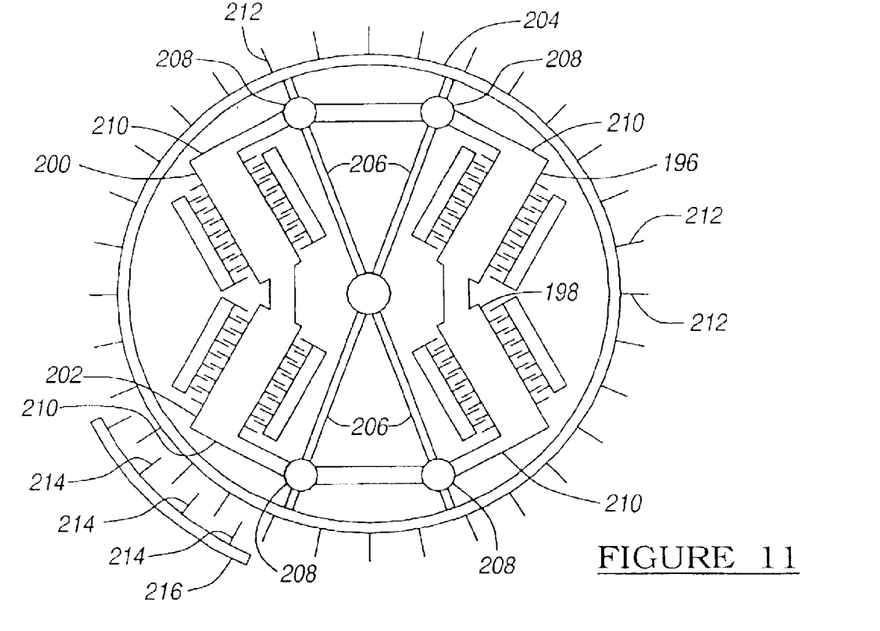
FIG. 11 represents a top view of the sensor according to the teachings of the fifth embodiment of the present invention.

FIG. 11 represents a top view of another embodiment according to the teachings of the present invention. Shown is a sensor 194 which has four drive elements 196, 198, 200, 202 coupled to a circular support frame 204. The drive elements 196, 198, 200, 202 are generally configured in an hourglass shape disposed within a circular support frame 204. Four rotation arms 206 support the hourglass configures drive elements 196, 198, 200, 202 at four vibrational nodal points 208. The nodal points 208 occur at the junction between the drive member support flange 210 and the rotational arms 206.

The support frame 24 defines a plurality of radially extending charged plates 212. These radially extending charged plates 212 interleave between the charged plates 214 of the sensing comb 216. As can be seen, the radial extended flanges can surround the entire circumference of the circular support frame 254. It is envisioned that the sensing combs can be disposed about only a port of the support frame 254.

Figure 12A:
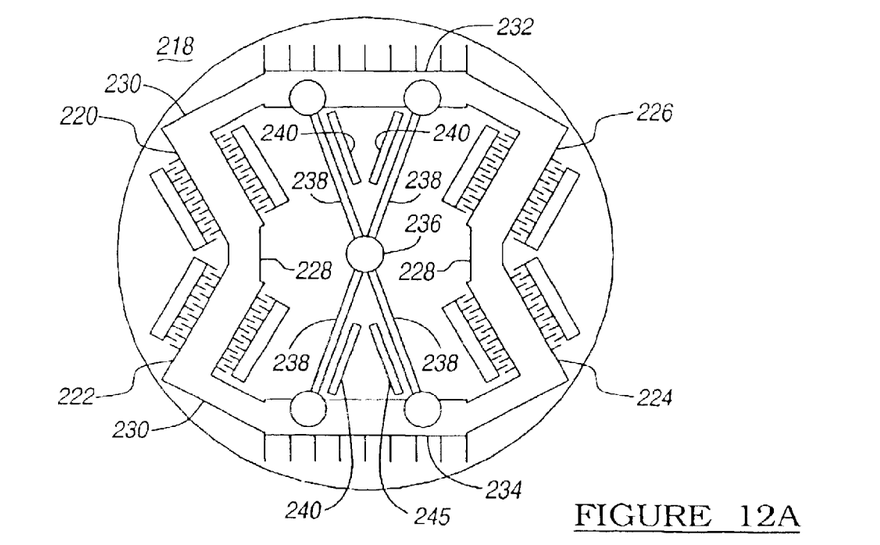
FIGS. 12A–C represent top views of the structure and function of a sensor according to the teachings of the sixth embodiment of the present invention.

FIG. 12A depicts another sensor 218 according the teachings of the present invention. Shown are four drive elements 220, 222, 224, 226 which are configured into an hourglass shape. The four drive elements 220, 222, 224, 226 are coupled together through a pair of central beam members 228. Additionally, the drive elements 220, 222, 224, 226 are coupled to a support frame 230 by members which are generally perpendicular to the drive elements 220, 222, 224, 226. The support frame 230 has a pair of curved longitudinal beams 232 and 234 which are coupled to and convex in relation to a central pole 236 by four rotational arms 233. Disposed immediately adjacent to each of the rotational arms 238 is a compensating electrode 240. The compensating electrode 240 and monitoring comb 242 are used in feedback loop to adjust the applications of forces to the drive elements 220, 222, 224, 226. At the intersection of the rotational arms 238 and the curved beams 232 and 234 are vibrational node points 235. Disposed on the support frame are a plurality of flanges 232 which are used in conjunction with a sensing comb 239 to sense the Coriolis forces 242.

Figure 12B:
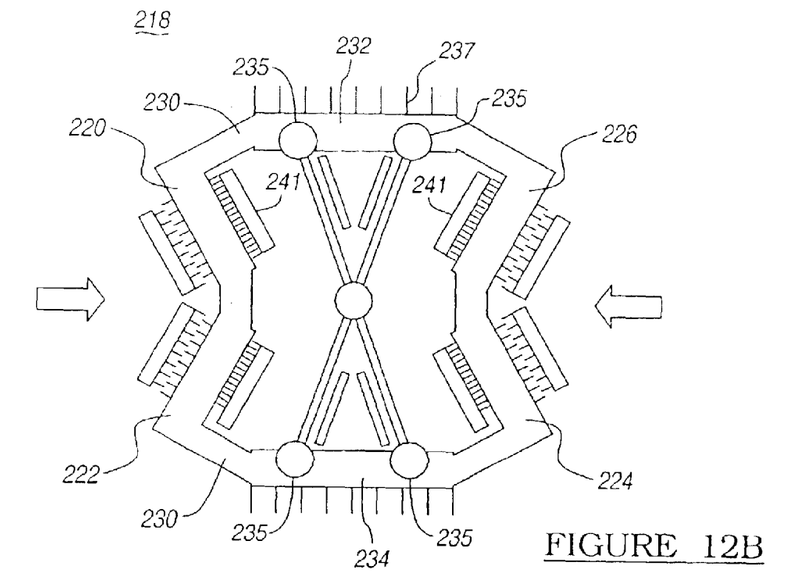
Figure 12C:
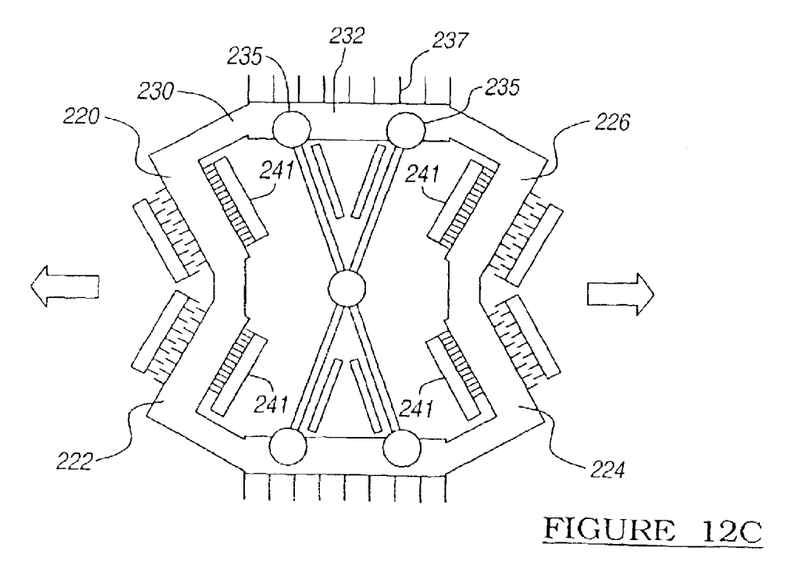

FIGS. 12B and 12C represent top views depicting the function of the sensor 218 according to the teachings of the sixth embodiment of the present invention. FIG. 12B depicts the sensor 218 when the drive elements 220, 222, 224 and 226 are driven toward the central pole 236. In this position, the curved continuous or segmented beams 232 and 234 are bent, having a smaller radius or curvature. The drive elements 220, 222, 224 and 226 are forced towards the monitoring combs 241. The sensor frame 230 is configured to place the vibrational nodes 235 of the sensor frame 230 between the sensing flanges 237 and the drive elements 220, 222, 224 and 226 to vibrationally isolate the components.

FIG. 12B represents a top view of the sensor 218 when the drive elements are being drawn away from the monitoring comb 241. In this regard, the curved beam 232 and 234 are bent so as to have a larger radius of curvature. Again, the vibrational nodes 235 are positioned so that little or no vibrational energy is transmitted to or through the four rotational arms 238.

Figure 13:
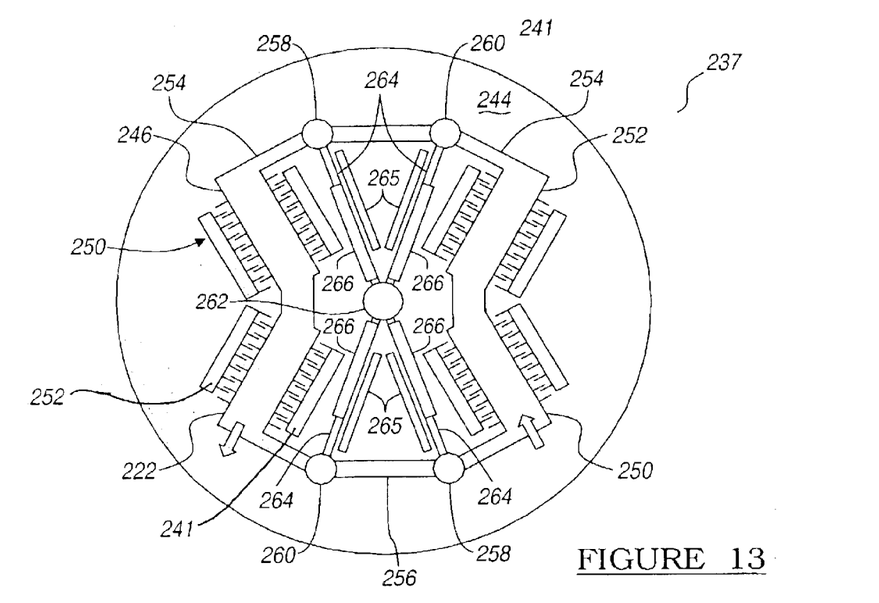
FIG. 13 represents a top view of the sensor according to the teachings of the seventh embodiment of the invention.

FIG. 13 depicts another embodiment of a sensor 244 according to the teachings of the present invention. Shown are four drive elements 246, 248, 250, 252 configured into an hourglass shape. The four drive elements 246, 248, 250, 252 are coupled to a support frame 254 generally perpendicular to the coupled drive elements 246, 248, 250, 252. The support frame 252 is comprised of two generally concave beam structures 254 and 256. Located at two points of the generally concave beam structures are a pair of node points 258 and 260. The support frame 252 is coupled to the central pole 262 utilizing rotation arms 264 which are disposed between the nodal points 258 and 260 and the central pole 262. Defined immediately adjacent to the rotation arms 264 are compensating electrodes 265, which are used with feedback a control circuit 288 (described below) to regulate the output of the sensor 244. Additionally, disposed upon the rotation arms 264 is a plurality of sensing elements 266 which can be constructed of piezo-resistive device or piezo-capacitive materials.

Figure 14:
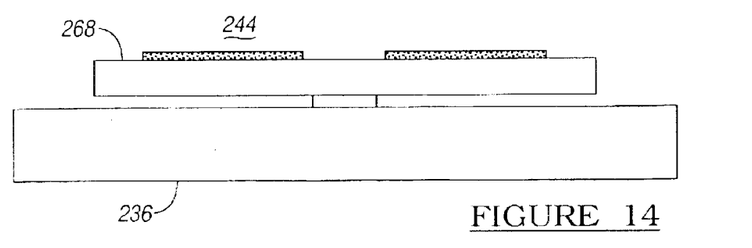
FIG. 14 represents a side view of the sensor according to the teachings of the seventh embodiment of the invention.

FIG. 14 represents a side view of the sensor 244 shown in FIG. 12. Shown are the sensing elements 266 disposed on top surface 268 of the rotational arms 264. As seen in FIG. 13, the sensing devices can be coupled into a rectifier configuration to increase the sensitivity of the sensing device. FIG. 14 depicts the use to the sensing elements 266 which are electrically connected using a bridge circuit, as is known in the art.

Figure 15:
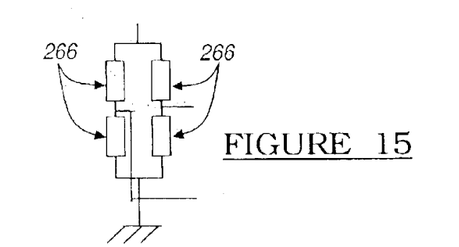
FIG. 15 represents a partial schematic showing the measurement of the signals according to the seventh embodiment of the present invention.
Figure 16:
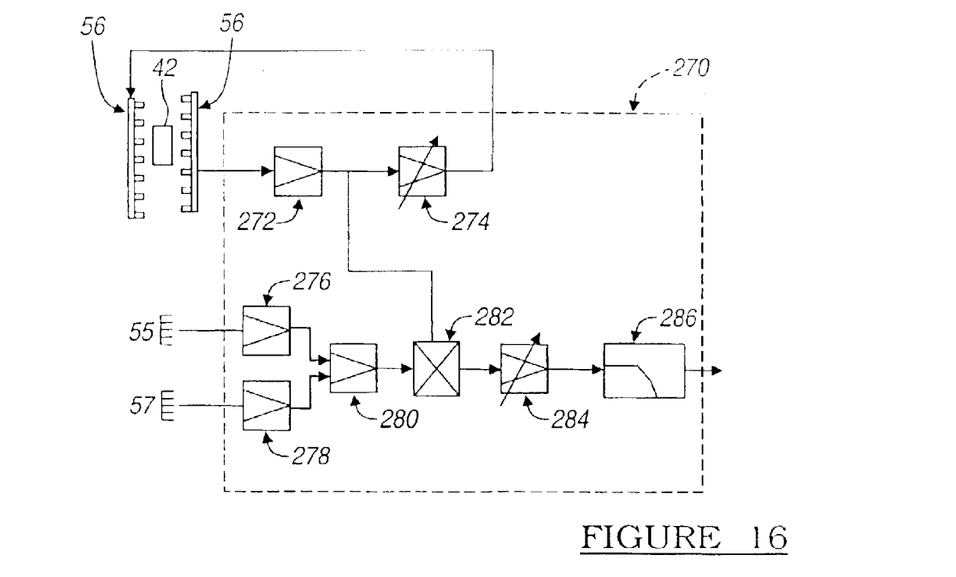
FIGS. 16 and 17 represent various schematic representations of circuits capable of discriminating Coriolis forces from the various sensor elements.

FIGS. 15 and 16 represent a schematic of a circuit 270 capable of discriminating Coriolis forces from the various sensor elements. While the following description references the sensor 40 according to the first embodiment of the invention, the use of the circuit 270 is equally applicable to the other embodiments.

Circuit 270 is configured to control the movement of the driven members 42 and 44 as well as the detection the Coriolis forces. In this regard, preamplifier 272 receives and amplifies a signal from monitoring comb 56. Automatic gain control 274 monitors the output of preamplifier 272 and automatically adjusts amplitude and frequency of the charge on drive comb 52, causing the vibration of drive element 42.

Simultaneously, the detection portion of the circuit 270 amplifies the signal for sensing combs 55 and 57 using preamplifiers 276 and 278. The output from preamplifiers 276 and 278 are compared utilizing differential amplifier 280, which greatly improves the monitoring resolution.

The output of the differential amplifier 280 is used in conjunction with the output of the drive circuit's preamplifier 272 by the synchronization detector 282 to detect and adjust for vibration noise from the driven elements. The output of the synchronization detector 282 is adjusted by a gain offset adjuster 284 and filtered by low pass filter 286 to produce a signal indicative of the detected Coriolis forces.

Figure 17:
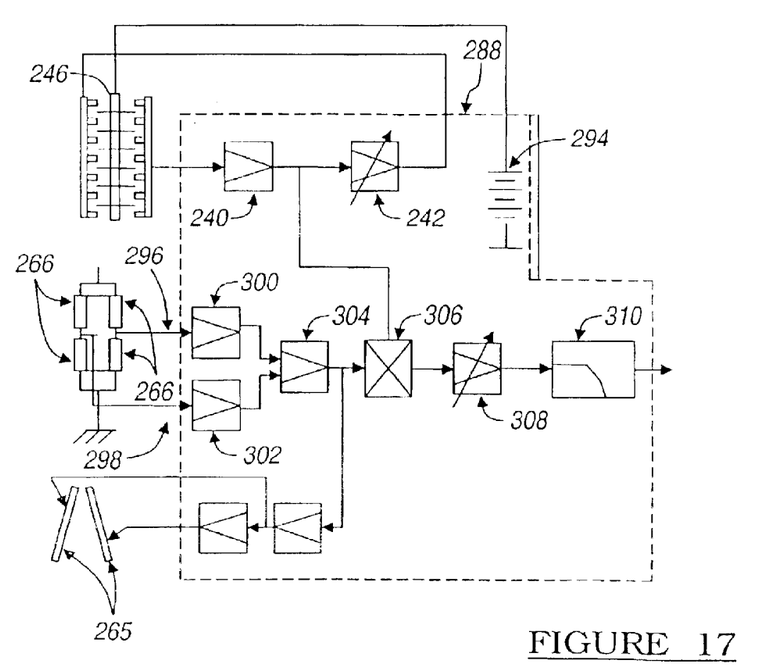

FIG. 17 represents a schematic of a circuit 288 capable of discriminating Coriolis forces from the various sensor elements. While the following description references the sensor 244 according to one embodiment of the invention, the use of the circuit 288 is equally applicable to the other embodiments.

Circuit 280 is configured to control the movement of the driven members 246, 248, 250, 252 as well as the detection the Coriolis forces. In this regard, preamplifier 290 receives and amplifies a signal from monitoring comb 246. Automatic gain control 292 monitors the output of preamplifier 290 and automatically adjusts amplitude and frequency of the charge on drive comb 247, causing the vibration of drive element 246.

Simultaneously, the detection portion of the circuit 288 amplifies the positive and negative signals 296 and 298 from sensors 266 using preamplifiers 300 and 302. The output from preamplifiers 300 and 302 are compared utilizing differential amplifier 304, which greatly improves the monitoring resolution. Additionally, the output of differential amplifier 304 is used by amplifiers 305 and 307 to adjust the charge on compensating electrodes 265.

The output of the differential amplifier 304 is used in conjunction with the output of the drive circuit's preamplifier 290 by the synchronization detector 306 to detect and adjust for vibrations noise from the driven elements 246, 248, 250, 252. The output of the synchronization detector 306 is adjusted by a gain offset adjuster 308 and filtered by low pass filter 310 to produce a signal indicative of the detected Coriolis forces.

Figure 18:
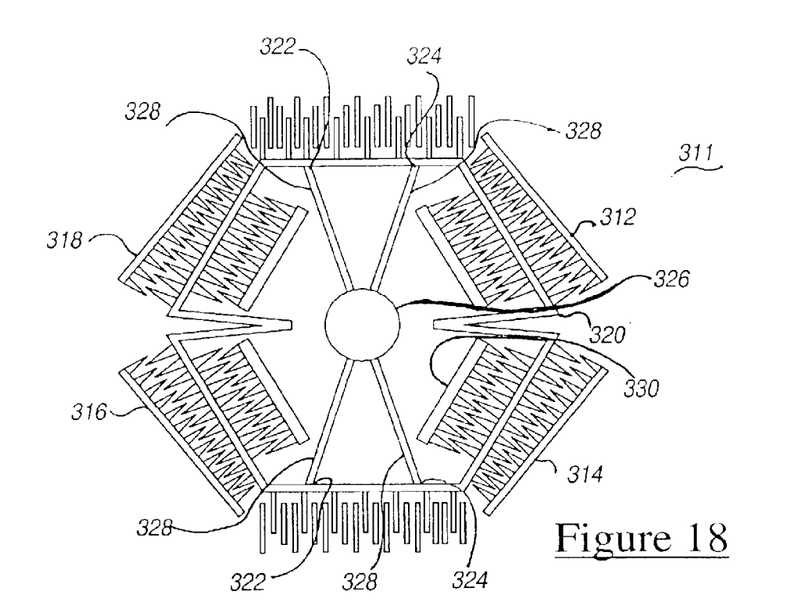
FIGS. 18–20 represent alternate configurations of sensors according to the teachings of the invention.

FIG. 18 depicts another embodiment of a sensor 311 according to the teachings of the present invention. Shown are four drive elements 312, 314, 316, 318 configured into an hourglass shape. The four drive elements 312, 314, 316, 318 are coupled to a support frame 320 generally perpendicular to the coupled drive elements 312, 314, 316, 318. The support frame 320 generally conforms to the support structure disclosed in FIG. 2D. Located at four points of the beam structures are two pairs of node points 322 and 324. The support frame 320 is coupled to the central pole 326 utilizing rotation arms 328 which are disposed between the nodal points 322 and 324 and the central pole 326. Defined immediately adjacent to the drive elements 312, 314, 316, 318 are compensating electrodes 330, which are used with the feedback control circuit 288 to regulate the output of the sensor 311.

Figure 19:
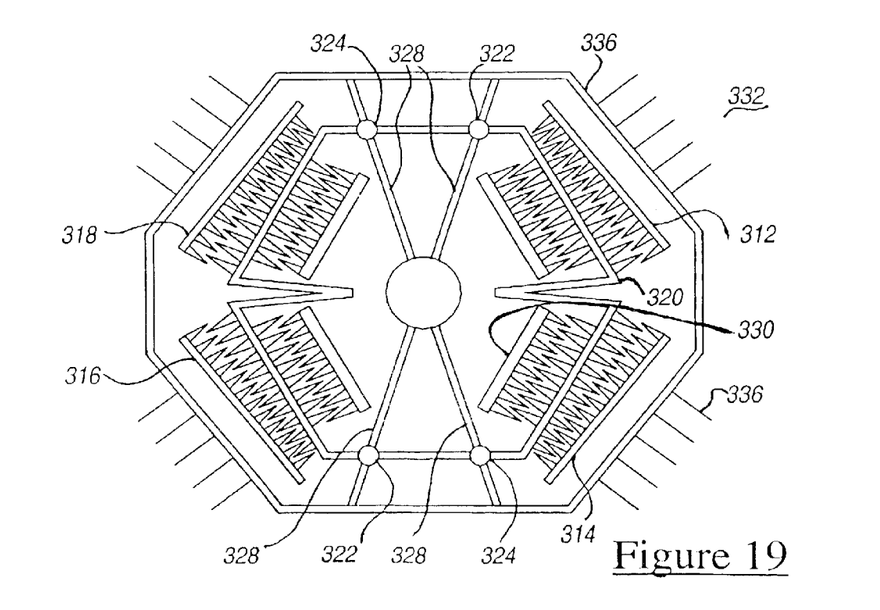

FIG. 19 depicts another embodiment of a sensor 332 according to the teachings of the present invention. Shown are four drive elements 312, 314, 316, 318 configured into an hourglass shape as described in the sensor according to FIG. 18. Coupled to the rotation arms 328 is an octagonal shaped member 334 which supports a plurality of sensor comb elements 336.

Figure 20:
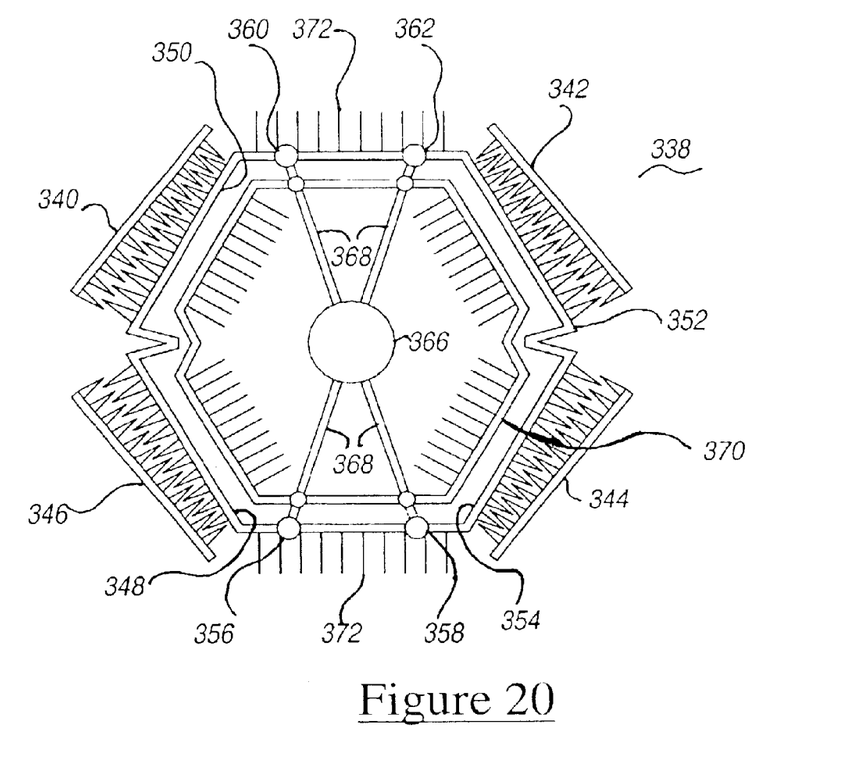

FIG. 20 depicts another embodiment of a sensor 338 according to the teachings of the present invention. Shown are four driven elements 340, 342, 344, 346 configured into a square shape. The four drive elements 340, 242, 344, 346 are coupled to a first support frame 348 generally perpendicular to the coupled driven elements 348, 350, 352, 354. The first support frame 348 has the configuration of the support frame shown in FIG. 2D. Located at four points of the generally support structure are node points 356, 358, 360, and 362. The first support frame 354 is coupled to the central pole 366 utilizing rotation arms 368 which are disposed between the nodal points and the central pole 366. A second support frame 370 having the shape according to one of FIGS. 2A–2D supports sensing or compensating comb 372. The second support frame 370 is coupled to the rotation arms 368 at its nodal points.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An angular velocity sensor comprising:
   a sensing element;
   first and second drive elements configured to be driven at a predetermined frequency, each of said first and second drive elements defining at least one vibrational node, the first and second drive elements being coupled to the sensing element at its respective vibrational node; and wherein the drive element oscillates about an axis and comprises an inertial mass configured to generate Coriolis forces which are measured by the sensor, and wherein the sensor is vibrationally decoupled from the sensing element when the drive elements are driven at the predetermined frequency.

2. The angular velocity sensor according to claim 1 comprising:
a single support member coupled to the sensing element and disposed between the first and second drive elements.

3. The angular velocity sensor according to claim 1 wherein the first and second drive elements define a plurality of first charge bearing plates and wherein said first charge bearing plates interleave with a plurality of second charge bearing plates disposed on a drive comb.

4. The angular velocity sensor according to claim 3 wherein the first and second drive elements have a vibrational resonant frequency and the first and second charge bearing plates are configured to accept an alternating charge, said alternating charge being the predetermined frequency of about a vibrational resonant frequency of the drive elements.

5. The angular velocity sensor according to claim 1 wherein the sensing element has a plurality of third charge bearing plates and wherein said third charge bearing plates interleave with a plurality of fourth charge bearing plates disposed on a sensing comb.

6. The angular velocity sensor according to claim 5 further comprising a support frame, said support frame being disposed between said sensing element and said first drive element; and
wherein said support member defines a portion of said sensing element.

7. An angular velocity sensor comprising:
a base;
a sensing element coupled to the base;
a pair of driven mass drive elements configured to be driven at a predetermined frequency, said driven mass drive elements having a support structure which defines at least one vibrational node at the predetermined drive frequency;
wherein the driven mass drive elements are coupled to the sensing element through the base at the vibrational node so as to allow the driven mass drive elements to oscillate about an axis to generate Coriolis forces which are measured by the sensing element.

8. The angular velocity sensor according to claim 7 wherein said support structure defines a tuning fork.

9. The angular velocity sensor according to claim 7 wherein said support structure defines a double tuning fork.

10. An angular velocity sensor comprising:
a support frame;
first and second drive elements configured to be driven at a predetermined frequency, the first and second drive elements each having a support element defining at least one vibrational node at the predetermined frequency, the first and second drive elements being coupled to the support frame at the vibrational node;
a sensing element coupled to the support frame; and
wherein the drive elements oscillate about an axis and comprises an inertial mass configured to generate Coriolis forces.

11. The angular velocity sensor according to claim 10 comprising:
a pair of drive elements coupled to the support frame; and
a single support member coupled to the support frame and the first drive element.

12. The angular velocity sensor according to claim 10 wherein said support frame defines a tuning fork.

13. The angular velocity sensor according to claim 10 wherein said support frame defines a double tuning fork.

14. The angular velocity sensor according to claim 10 wherein the first drive element defines a plurality of first charge bearing plates and wherein said first charge bearing plates interleave with a plurality of second charge bearing plates disposed on a drive comb.

15. The angular velocity sensor according to claim 14 wherein the drive elements have a vibrational resonant frequency and the first and second charge bearing plates are configured to accept an alternating charge, said alternating charge having a frequency of about the vibrational resonant frequency.

16. The angular velocity sensor according to claim 10 wherein the sensing element has a plurality of third charge bearing plates and wherein said third charge bearing plates interleave with a plurality of fourth charge bearing plates disposed on a sensing comb.

17. An angular velocity sensor comprising:
a pair of drive elements configured to be driven at a drive frequency, each of the drive elements having a support element defining at least one vibrational node at the drive frequency, the drive elements being coupled to the support element at the vibrational node;
a sensing element coupled to the drive elements;
a single support member coupled to the sensing and drive elements; and
wherein the drive elements oscillate about an axis and comprises an inertial mass configured to generate Coriolis forces.

18. An angular velocity sensor comprising:
a means for generating Coriolis forces being driven at a drive frequency;
a means for sensing Coriolis forces;
a means for coupling said means for generating Coriolis forces and said means for sensing Coriolis forces, said means for coupling having a vibrational node at the drive frequency, the vibrational node being disposed between said means for generating Coriolis forces and said means for sensing Coriolis forces.

19. The angular velocity sensor according to claim 18 further having a single support pole configured to support the means for generating Coriolis forces.

* * * * *